United States Patent
Hörmann

(10) Patent No.: US 6,859,004 B2
(45) Date of Patent: Feb. 22, 2005

(54) DRIVE FOR CLOSING DEVICES WITH VARIABLE SPEED OUTPUT

(75) Inventor: Michael Hörmann, Halle (DE)

(73) Assignee: Marantec Antriebs-und Steuerungstechnik GmbH & Co. KG, Marienfeld (DE)

(*) Notice: Subject to any disclaimer, the term of this patent is extended or adjusted under 35 U.S.C. 154(b) by 0 days.

(21) Appl. No.: 10/653,543

(22) Filed: Sep. 2, 2003

(65) Prior Publication Data

US 2004/0056623 A1 Mar. 25, 2004

Related U.S. Application Data

(62) Division of application No. 09/772,009, filed on Jan. 29, 2001, now Pat. No. 6,640,494.

(30) Foreign Application Priority Data

Jan. 28, 2000 (DE) .......................................... 100 03 630

(51) Int. Cl.[7] ................................................. H02P 3/00
(52) U.S. Cl. ........................ 318/469; 318/280; 318/286; 318/466; 49/26; 49/28
(58) Field of Search ................................ 318/466, 470, 318/286, 280, 469; 49/26, 28

(56) References Cited

U.S. PATENT DOCUMENTS

| | | | | |
|---|---|---|---|---|
| 2,619,939 A | * | 12/1952 | Oishei et al. ................. 91/396 |
| 3,612,220 A | * | 10/1971 | Hall et al. ..................... 187/295 |
| 4,228,396 A | * | 10/1980 | Palombo et al. ............. 324/163 |
| 4,328,451 A | * | 5/1982 | Barge .......................... 318/596 |
| 4,449,082 A | * | 5/1984 | Webster ....................... 318/271 |
| 5,126,642 A | * | 6/1992 | Shahrodi ..................... 318/433 |
| 5,142,824 A | * | 9/1992 | Le Compagnon et al. .... 49/349 |
| 5,349,276 A | * | 9/1994 | Mezzatesta et al. ......... 318/268 |
| 5,351,439 A | * | 10/1994 | Takeda et al. .................. 49/28 |
| 5,353,859 A | * | 10/1994 | Oltahfer et al. ............. 160/310 |
| 5,552,685 A | * | 9/1996 | Young et al. ................ 318/254 |
| 5,606,826 A | * | 3/1997 | Calhooun ..................... 49/138 |
| 5,780,984 A | * | 7/1998 | Miyako et al. .............. 318/268 |
| 5,877,955 A | * | 3/1999 | Struyk .......................... 700/69 |
| 5,929,580 A | * | 7/1999 | Mullet et al. ................ 318/466 |
| 6,082,433 A | * | 7/2000 | Vafaie et al. ................ 160/310 |
| 6,208,102 B1 | * | 3/2001 | Kikuchi et al. ............. 318/466 |
| 6,215,265 B1 | * | 4/2001 | Wolfer et al. ............... 318/434 |
| 6,388,412 B1 | * | 5/2002 | Reed et al. .................. 318/466 |
| 6,484,784 B1 | * | 11/2002 | Weik et al. ..................... 160/7 |

\* cited by examiner

Primary Examiner—Rita Leykin
(74) Attorney, Agent, or Firm—Dilworth & Barrese LLP

(57) ABSTRACT

The invention concerns a drive for closing devices, for example gates or shutters, with variable speed output drive and a device for detecting a given position of the closing device. According to the invention, the drive speed output depends on the position of the gate and can be controlled depending on the given mechanical closing characteristic of the closing device.

26 Claims, 1 Drawing Sheet

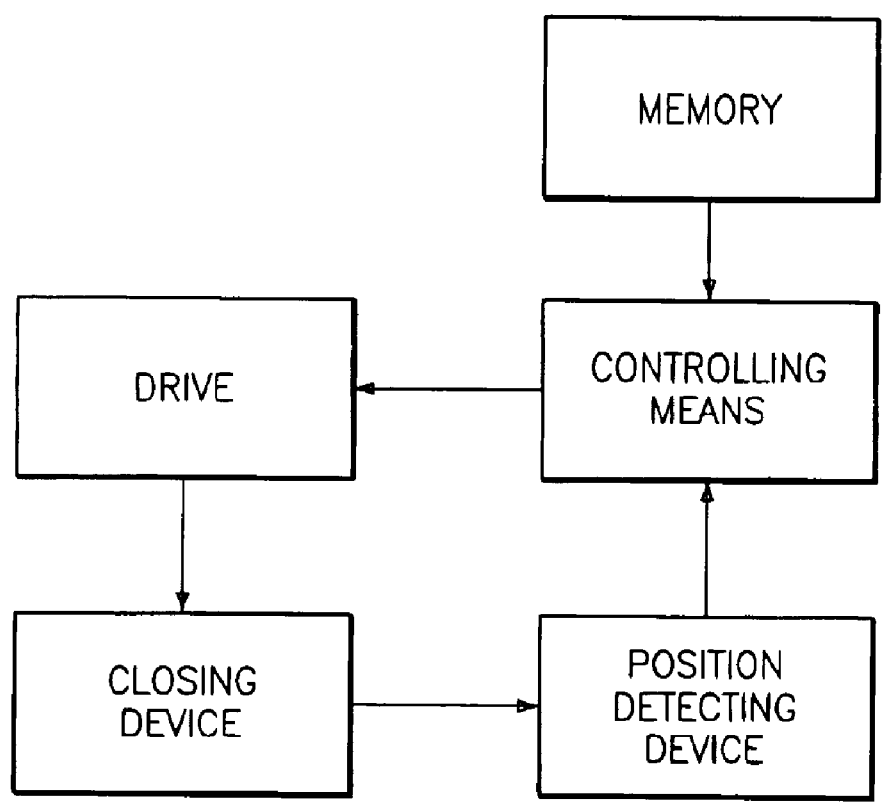

DRIVE FOR CLOSING DEVICES WITH VARIABLE SPEED OUTPUT

CROSS-REFERENCE TO RELATED APPLICATION(S)

This is a divisional of application Ser. No. 09/772,009 filed Jan. 29, 2001, now U.S. Pat. No. 6,640,494.

BACKGROUND OF THE INVENTION

The invention concerns a drive for closing devices, such as gates and shutters, with variable speed output and a device for detecting a given position of the closing.

With respect to the operating of doors and gates, the use of variable-speed drives to impart motion to doors and gates is already known. For example, garage-door drives are known in which slow opening and closing speeds are used during the starting and stopping phase. A "gentle action" in the opening and closing of garage doors is thereby achieved. Initial slow acceleration of the garage door out of rest position to final motion speed, and its slowing down with appropriate deceleration before coming to a stop, is also ensured. This prevents a sudden crash of the garage door, which can lead to locking of the door and to annoying noise.

Additionally, frequency-converter-controlled drives that propel doors rapidly into open position and slowly into closed position by means of an appropriate frequency default are used in industry.

Additionally, a non-constant opening and closing movement of a closing device—for example a gate, a door, or a shutter—is also created by the design-related mechanical quality of the closing mechanism itself. The drive moment of the drive is transferred in a number of different ways to closing devices, that is, doors, gates, shutters, etc. Industrial gates are often activated by means of shaft drives that act directly on the rolling shaft. Similarly, in rolling gates in which the gate is wrapped spirally on a rolling shaft, this rolling shaft is operated directly by the drive. In sectional gates a torsion spring shaft is usually driven by winding drums. The cables are wound on the drums. The gate hanging on the cables is operated by means of the rotation of the drums.

When the aforementioned closing devices are activated, because of different mechanical winding principles of the closing devices different gate section speeds occur, if we assume here a constant speed output of the drive. In the case of the rolling gate, these different speeds are created by the spiral-shaped winding. In the case of a constant rolling-shaft speed, the rolling gate will initially close out of its wound-up state at a higher speed than is the case shortly before complete unwound state, since during the unrolling of the rolling gate the diameter of the spiral turn diminishes and thus the circumferential speed at which the rolling gate descends quickly decreases. Conversely, when the rolling gate is rolled up it moves more slowly, with a still smaller coil diameter, than is the case just before it reaches the maximum coil diameter.

In the case of the sectional gate, the differences in the opening and closing speeds result from the fact that for reasons of adjustment of gate weight and spring differential the cable drums are not always cylindrical, they can be conical or even a combination of cylindrical and conical. Here again, variable gate section speeds are thereby created with constant speed output.

While the above-described changes in speed in the opening and closing of closing devices are desirable, and are achieved by means of variable-speed drive of the closing devices, changes in speed during opening and closing of closing devices because of design-related characteristics are not desired.

It has been recognized that for safety reasons it is desirable to try to achieve defined and unchanging gate section speeds, except during the starting and stopping phases.

This leads to the task of perfecting a drive according to the generic model in such manner that closing devices can be operated, regardless of their construction, with defined, unchanging opening and closing speeds.

SUMMARY OF THE INVENTION

According to the invention, this task is performed by a closing-device variable-speed drive according to the generic model, by means of the combination with the characteristics of the drive speed output depending upon position of the closing device, and controllable based on given mechanical closing characteristic of the closing device.

Accordingly, a drive for closing devices such as gates or shutters with variable-speed drive and a device for detecting a given position of the closing device is designed in such manner that the speed output of the drive can be controlled, depending on the position of the closing device and depending on the mechanical closing characteristic of the closing device in question. An unvarying opening and closing speed can thereby be ensured for a wide variety of types of gates, doors, or shutters. By means of the control mechanism, provision can of course also be made for slower speeds during the starting and stopping phases. However, it is essential that a constant operating speed be adjustable for most of the operating path.

BRIEF DESCRIPTION OF THE DRAWINGS

The present invention will be described in greater detail by reference to the accompanying drawing which schematically illustrates the cooperation between components forming the drive of the present invention.

DESCRIPTION OF THE PREFERRED EMBODIMENTS

Particularly advantageous embodiments of the invention result from the description herein.

According to the description herein, the drive control mechanism can be connected with an incremental or absolute path detector for detecting and reporting the position of the closing device.

The control mechanism can have at least one memory in which the values of the mechanical closing characteristic of at least one closing element can be stored. Depending on the position of the closing device and the reading of the actual table of values of the closing characteristic, the control mechanism can then determine the control variable for the output speed of the geared motor. If there is more than one memory, a variety of closing characteristics for a variety of closing devices can be stored in the drive. The drive can thus be used in a particularly advantage manner for a variety of closing devices. Switching-on can occur just before actuation of the closing device connected with the drive by means of programming of the memory with the values containing the characteristic of the connected closing device.

In an alternative to the aforementioned design, the drive can have, in addition to an operating mode, an intelligent mode for detecting the closing characteristic, in which, depending on the position of the closing device, the drive detects the mechanical closing characteristic by determining the torque converter course via the operating path of the closing device. This characteristic can then likewise be stored in a memory that in operating mode coordinates the given closing characteristic values of the given position of the closing device. In a rolling gate, for example, the gate characteristic resulting from the spiral roll-up, and in a sectional gate the modified torque conversion needed, can be determined based on the conical-cylindrical cable drum path, and can be stored in a memory for use in the operating mode of the gate in question.

Application of the above-described drive as a rolling-gate or sectional-gate drive is advantageous.

What is claimed is:

1. A drive system for a closing device having
   a variable speed output drive,
   a device for detecting position of the closing device,
   means for controlling drive speed output depending upon the position of the closing device,
   means for controlling the drive speed output based upon given mechanical closing characteristic of the closing device, and
   an incremental or absolute path detection device for detecting and reporting the position of the closing device and connected with said controlling means, wherein
   said controlling means comprise memory, in which values of the mechanical closing characteristics of a variety of closing devices are stored.

2. A drive system according to claim 1, wherein in addition to the operating mode, the drive system comprises an intelligent mode in which, based upon the position of the closing device, detects the mechanical closure characteristics by determining torque by operating path of the closing device.

3. A drive system according to claim 1, wherein in addition to the operating mode, the drive system comprises an intelligent mode in which, based upon the position of the closing device, detects the mechanical closure characteristics by determining winding/unwinding torque via an operating path for each position of the closing device.

4. A drive system according to claim 1, wherein said controlling means comprise at least one memory, in which values of torque of the drive are stored.

5. A drive system according to claim 1, wherein the closing device comprises a rolling gate.

6. A drive system according to claim 1, wherein the closing device comprises a sectional gate.

7. A drive system according to claim 1, wherein a slower speed of the closing device is provided during the start-up phase and the stopping phase.

8. The drive system according to claim 4, wherein, depending upon the position of the closing device and a reading of a table of the values of the torque of the drive stored in said memory, said controlling means determine a control variable for an output speed of a geared motor constituting said drive.

9. A drive system according to claim 1, wherein said controlling means select one of the stored mechanical closing characteristics and control said variable speed output drive based upon the selected mechanical closing characteristic to provide the drive speed output necessary for achieving a desired closing device speed for each position of the closing device.

10. A drive system according to claim 9, wherein the mechanical closing characteristic constitutes a gear ratio of a driving train between the drive and closing device.

11. A drive system according to claim 1, wherein the mechanical closing characteristic constitutes a gear ratio of a driving train between the drive and closing device.

12. A drive system according to claim 11, wherein said controlling means control said variable speed output drive to ensure substantially constant speed of the closing device between a start-up phase and a stopping phase along the path.

13. A drive system according to claim 10, wherein said controlling means control said variable speed output drive to ensure substantially constant speed of the closing device between a start-up phase and a stopping phase along the path.

14. A drive system according to claim 9, wherein said controlling means control said variable speed output drive to ensure substantially constant speed of the closing device between a start-up phase and a stopping phase along the path.

15. A drive system according to claim 1, wherein said controlling means control said variable speed output drive to ensure substantially constant speed of the closing device between a start-up phase and a stopping phase along the path.

16. A drive system according to claim 9, wherein a slower speed of the closing device is provided during the start-up phase and the stopping phase.

17. A drive system according to claim 10, wherein a slower speed of the closing device is provided during the start-up phase and the stopping phase.

18. A drive system according to claim 11, wherein a slower speed of the closing device is provided during the start-up phase and the stopping phase.

19. A drive system according to claim 9, wherein said controlling means comprise at least one memory, in which values of torque of the drive are stored.

20. The drive system according to claim 19, wherein, depending upon the position of the closing device and a reading of a table of the values of the torque of the drive stored in said memory, said controlling means determine a control variable for an output speed of a geared motor constituting said drive.

21. A drive system according to claim 10, wherein said controlling means comprise at least one memory, in which values of torque of the drive are stored.

22. The drive system according to claim 21, wherein, depending upon the position of the closing device and a reading of a table of the values of the torque of the drive stored in said memory, said controlling means determine a control variable for an output speed of a geared motor constituting said drive.

23. A drive system according to claim 11, wherein said controlling means comprise at least one memory, in which values of torque of the drive are stored.

24. The drive system according to claim 23, wherein, depending upon the position of the closing device and a reading of a table of the values of the torque of the drive stored in said memory, said controlling means determine a control variable for an output speed of a geared motor constituting said drive.

25. A drive system according to claim 12, wherein said controlling means comprise at least one memory, in which values of torque of the drive are stored.

26. The drive system according to claim 25, wherein, depending upon the position of the closing device and a reading of a table of the values of the torque of the drive stored in said memory, said controlling means determine a control variable for an output speed of a geared motor constituting said drive.

* * * * *